May 19, 1931. F. HANSES 1,805,822
VEHICLE TOWING DEVICE
Filed Feb. 18, 1930 2 Sheets-Sheet 2
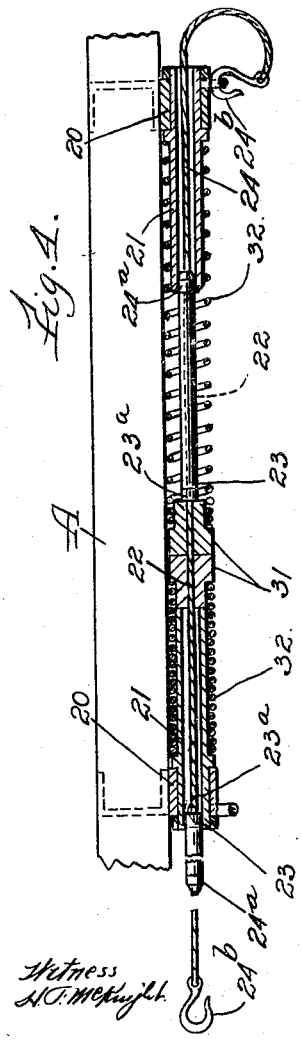
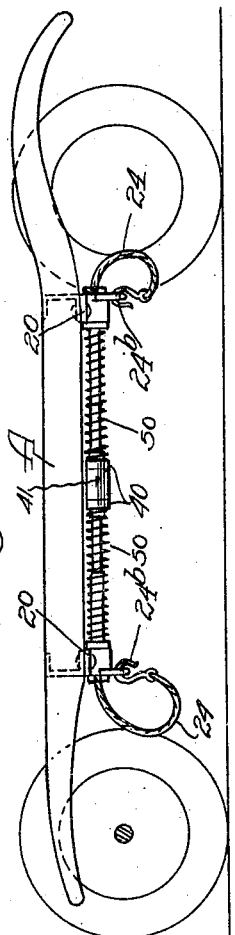
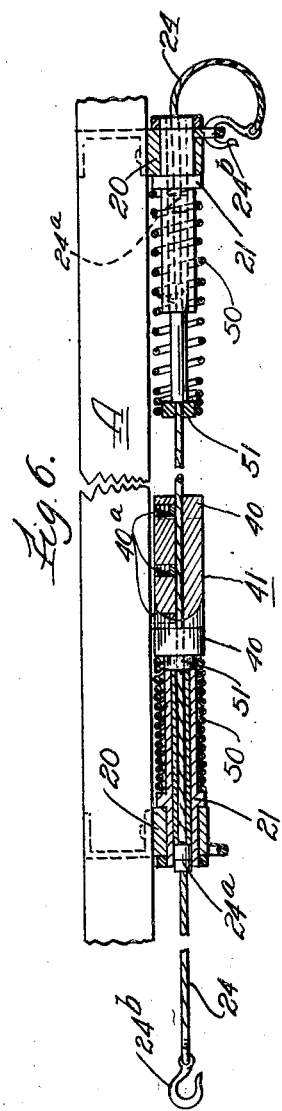
Inventor.
Frank Hanses.
by Burton + Burton
his Attorneys.

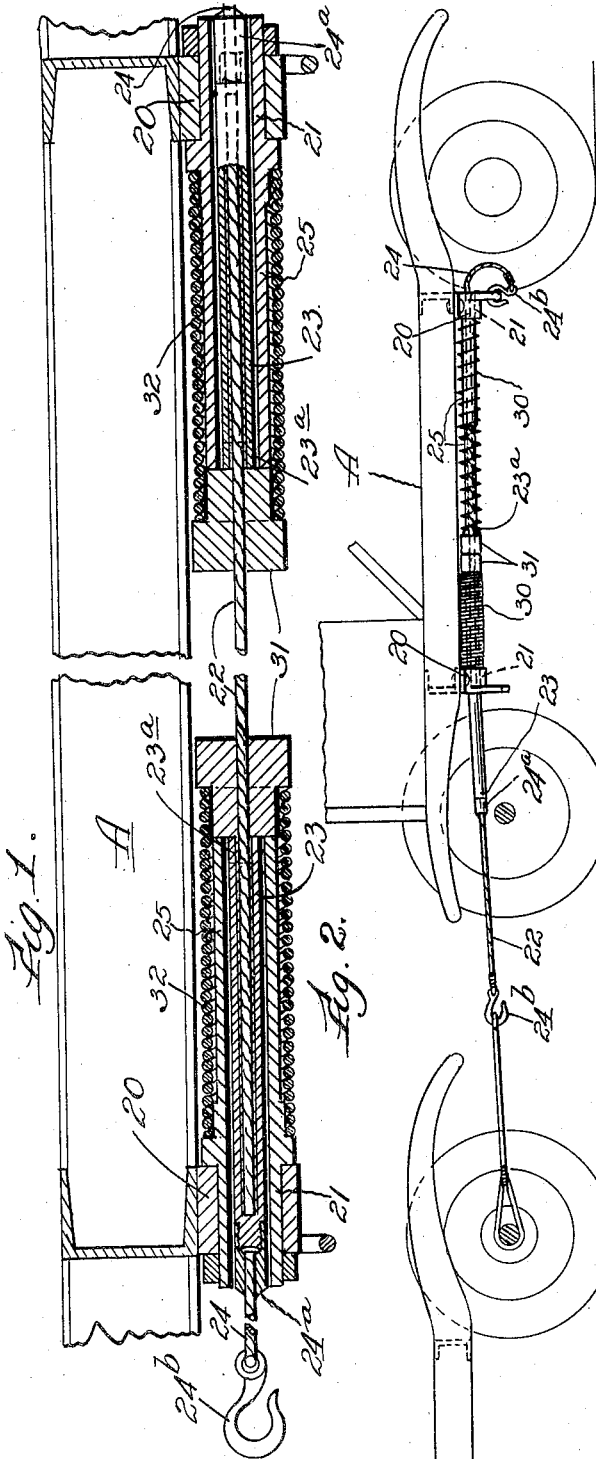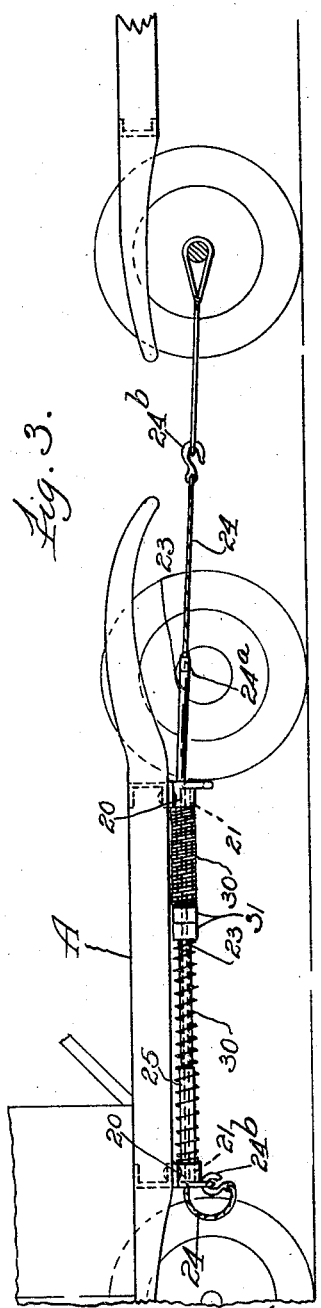

Patented May 19, 1931

1,805,822

UNITED STATES PATENT OFFICE

FRANK HANSES, OF GLENVIEW, ILLINOIS

VEHICLE TOWING DEVICE

Application filed February 18, 1930. Serial No. 429,431.

The purpose of this invention is to provide an improved construction of a towing device for motor vehicles adapted to be carried by the vehicle and adapted for connection with another vehicle either for towing the latter or being towed thereby. It consists in the elements and features of construction shown and described as indicated in the claims.

In the drawings:

Figure 1 is a diagrammatic view in the nature of a longitudinal vertical section of the chassis or frame structure of a motor vehicle equipped with the device embodying this invention, the several parts being shown in the relative positions occupied when not connected for towing or being towed.

Figure 2 is a similar view showing the towing device connected with another vehicle for towing the vehicle upon which the device is mounted.

Figure 3 is a similar view showing the towing device connected with another vehicle to be towed by the vehicle which is provided with the towing device.

Figure 4 is a detail section axial with respect to the guide bearings of the draft member of the towing device.

Figure 5 is a view similar to Figure 1 showing a modification.

Figure 6 is an axial section of the modification shown in Figure 5.

Referring to the drawings in detail:—The chassis or frame of the vehicle equipped with this invention is indicated by reference character, A. Upon the frame structure there are mounted toward the front and rear ends thereof brackets, 20, 20, in which are fixedly mounted longitudinal guide bearings, as seen at 21, 21, for a draft member, 22, which, as shown, is a cable having secured upon it at suitable points in its length for sliding in the guide bearings 21, encasing and reenforcing sleeves, 23, whose inner end portions, 23$^a$, serve also as stops, as hereinafter mentioned. At the end portions of the draft member outside the front and rear ends of the respective guide bearings, 21, 21, the draft member is furnished at each end with suitable means for coupling to the vehicle to be towed, or by which the vehicle equipped with the apparatus is to be towed, said coupling means, as shown, being a short length of cable, 24, having made fast to one end a coupling, 24$^a$, arranged to be screwed onto the outer end of the sleeve, 23, which is reduced in diameter and threaded for receiving said coupling, the other end of the cable, 24, having secured to it a hook, 24$^b$, for engaging the towed or towing vehicle.

In the form shown in Figures 1 and 4, the springs, 30, 30, are coiled about the draft member and each secured at its outer end to the guide bearing, 21, and thereby to the bracket, 20, such securement being by any suitable means, the inner end of the spring being provided with a stop collar, 31, to which said inner end is made fast, as by soldering, for stretching the spring.

Upon the draft member within the springs, respectively, there are provided fast on said draft member, stops, 23$^a$, which, as shown, may be the inner end portions of the sleeves, 23, said stops as well as the entire sleeves being dimensioned for moving freely within the springs and arranged to encounter the inner end stop collars, 31, 31, respectively, in the longitudinal movement of the draft member in opposite directions.

The two springs are dimensioned, and the brackets, 20, 20, are spaced apart longitudinally of the vehicle frame to adapt either spring to be stretched by the longitudinal movement of the draft member for encounter of its inner end stop collar, 31, with the corresponding collar of the opposite spring, without over-straining the first mentioned spring in stretching to that extent. Desirably the guide bearing members, 20, 20, are furnished with tubular extensions, 25, 25, extending inwardly, that is, from the end at which the springs respectively are secured to said guide bearing within the springs for guiding the springs in stretching and reacting, and affording guidance also for the stops, 23$^a$.

In the form shown in Figure 6, the construction is arranged for employing compression springs instead of stretched springs, and for this purpose there are provided mounted on the draft member fixedly as by set screws 40ª, between the guide bearings, stops, 40, 40, which may be, as shown, opposite end portions of a unitary sleeve member, 41. In this form, compression coil springs, 50, 50, are coiled about the draft member between the guide bearing members and the stops, 40, 40, respectively. Perferably, but not necessarily, the springs, 50, 50, are secured at their opposite ends to the guide bearings, 21, 21, respectively, as in the case of the stretched springs of the first described form, and provided at their inner ends with stop collars, 51, 51, for encounter with the stops, 40, 40, carried by the guide member.

The operation of the device in the two forms shown is substantially the same, and may be understood from the foregoing description of the structure, being that when the vehicle upon which the device is mounted is to be towed, or there is occasion for towing another vehicle by it, the draft member will be withdrawn from one end or the other,—from the rear end when another vehicle is to be towed, and from the forward end when the vehicle equipped with the device is to be connected for towing another vehicle,—the withdrawn end being coupled to the other vehicle; and it will be seen that in the towing in the case of the first described form, the spring at the opposite end from that at which the draft member is coupled to the other vehicle will yield by stretching when the draft strain is applied, defeating liability of breaking the towing connection by the sudden pick-up of the load; and in the other form, having the compression spring, similar accommodation will be afforded by the yield of the opposite spring to compression.

It will be obvious that springs of other form may be employed with the same advantage of taking up slack and preventing rupture of the towing member, and I do not wish to be limited to a spring coiled about the draft member, whether a compression spring or a stretched spring, but I consider the spring coiled about the draft member as the most desirable form.

I claim:

1. A towing device for motor vehicles comprising a draft member dimensioned and arranged for extending lengthwise of the vehicle frame; guide bearings for said draft member adapted to be mounted on the vehicle frame toward the front and rear ends thereof, stops carried by the draft member; springs arranged for co-operation with said stops respectively in the opposite longitudinal movements of the draft member through said guide bearings and to react between said stops and the respective guide bearings, the draft member being arranged at its opposite ends for towing connection with another vehicle.

2. The construction defined in claim 1, the springs being interposed on the draft member between said guide bearings.

3. The construction defined in claim 1, the springs being interposed on the draft member between the guide bearings and arranged to be stretched for said reaction on said bearings respectively.

4. The construction defined in claim 1, the springs being coiled around the draft member and secured at one end to the bearings respectively and provided at the other end with means for encounter of the stops respectively, the stops being mounted on the draft member for being carried thereby within the respective springs, the springs each being furnished at the end opposite the securement to the bearings with stops for encounter by the draft member stops in the draft movement of said draft member for stretching the coil springs for their reaction between the draft member and the guide bearings respectively.

5. A towing device for a motor vehicle comprising two guide bearing members arranged for permanent mounting on the vehicle frame toward the front and rear ends thereof respectively and extending lengthwise thereof; a draft member mounted for guidance in and extending through both said guide bearings and having its ends outside both guide bearings provided with vehicle engaging means, and spring means reacting between said guide bearing members respectively and the draft member longitudinally of the latter for retracting the draft member inwardly with respect to the longitudinal dimension of the vehicle frame from both ends thereof.

6. In the construction defined in claim 1, the springs being coiled about the draft member, the stops being fixedly mounted on the draft member spaced apart from each other between the proximate ends of the springs, the springs being arranged for compression between said stops respectively, and the respective guide bearings in the draft on the draft member in opposite directions for towing the vehicle in opposite directions.

In testimony whereof, I have hereunto set my hand at Chicago, Ill., this 17th day of February, 1930.

FRANK HANSES.